United States Patent
Cerny et al.

(10) Patent No.: US 9,222,779 B2
(45) Date of Patent: Dec. 29, 2015

(54) METHOD, APPARATUS AND COMPUTER PROGRAM PRODUCT FOR COLLABORATIVE PRESENTATION OF TRAVEL ROUTE INFORMATION

(71) Applicant: HERE Global B.V., Veldhoven (NL)

(72) Inventors: Karoline Cerny, Berlin (DE); Karen Janssen, Berlin (DE); Elena Rovati, Berlin (DE)

(73) Assignee: HERE Global B.V., Veldhoven (NL)

( * ) Notice: Subject to any disclaimer, the term of this patent is extended or adjusted under 35 U.S.C. 154(b) by 199 days.

(21) Appl. No.: 13/904,741

(22) Filed: May 29, 2013

(65) Prior Publication Data

US 2014/0358438 A1 Dec. 4, 2014

(51) Int. Cl.
*G01C 21/34* (2006.01)
*G08G 1/0969* (2006.01)
*G01C 21/20* (2006.01)
*G01C 21/00* (2006.01)
(Continued)

(52) U.S. Cl.
CPC ................ *G01C 21/00* (2013.01); *G01C 21/20* (2013.01); *G01C 21/367* (2013.01); *G01C 21/3661* (2013.01); *G01C 21/3673* (2013.01); *G08G 1/0969* (2013.01); *H04W 4/02* (2013.01); *H04W 4/025* (2013.01)

(58) Field of Classification Search
CPC .... G01C 21/00; G01C 21/20; G01C 21/3661; G01C 21/367; G01C 21/3673; G08G 1/0969; H04W 4/02; H04W 4/025
USPC ......... 701/400, 408–410, 420, 426, 431, 438, 701/454, 459, 467, 532, 533, 537; 340/995.1, 995.14, 995.15, 995.17, 340/995.19, 995.24
See application file for complete search history.

(56) References Cited

U.S. PATENT DOCUMENTS

| | | | |
|---|---|---|---|
| 6,199,010 B1 * | 3/2001 | Richton | 701/461 |
| 6,950,743 B2 * | 9/2005 | Kainuma et al. | 701/532 |
| 8,352,178 B2 * | 1/2013 | Allen et al. | 701/410 |

(Continued)

FOREIGN PATENT DOCUMENTS

| | | |
|---|---|---|
| DE | 10 2007 046317 A1 | 4/2009 |
| WO | WO 2008/079891 A2 | 7/2008 |
| WO | WO 2009/043801 A1 | 4/2009 |

OTHER PUBLICATIONS

International Search Report and Written Opinion for Application No. PCT/EP2014/060035 dated Aug. 20, 2014.

*Primary Examiner* — Russell Frejd
(74) *Attorney, Agent, or Firm* — Alston & Bird LLP (57) ABSTRACT

Provided herein is a method, apparatus and computer program product for the collaborative presentation of information relating to a travel route. In particular, the method may include providing for display of primary information on a display of a first device, providing for display of ancillary of information on a display of a second device, receiving location information at the first device, and updating the ancillary information provided for display on the display of the second device in response to receiving the location information at the first device. The primary information may include route-guidance information for a route. The ancillary information may include information associated with the route. The ancillary information may include additional information relative to the primary information. The ancillary information may include point-of-interest information along the route.

16 Claims, 8 Drawing Sheets

(51) Int. Cl.
*H04W 4/02* (2009.01)
*G01C 21/36* (2006.01)

(56) References Cited

U.S. PATENT DOCUMENTS

2006/0041379 A1   2/2006   Brulle-Drews
2007/0200713 A1   8/2007   Weber et al.
2008/0161020 A1*  7/2008   Malon .................... 455/456.6
2008/0171555 A1   7/2008   Oh et al.
2009/0005018 A1   1/2009   Forstall et al.
2009/0254840 A1  10/2009   Churchill et al.
2010/0332119 A1* 12/2010   Geelen et al. ................ 701/201
2011/0046878 A1*  2/2011   Sung et al. .................... 701/206

* cited by examiner

METHOD, APPARATUS AND COMPUTER PROGRAM PRODUCT FOR COLLABORATIVE PRESENTATION OF TRAVEL ROUTE INFORMATION

TECHNOLOGICAL FIELD

Example embodiments of the present invention relate generally to the collaborative presentation of information on at least two displays, and more particularly, to a method, apparatus, and computer program product for providing for display of primary information on a first device, and providing for display of ancillary information on a second device, where the ancillary information is more detailed point-of-interest information relative to the primary information.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Mobile devices, such as cellular telephones, have become smaller and lighter while also becoming more capable of performing tasks that far exceed a traditional voice call. Mobile devices are becoming small, portable computing devices that are capable of running a variety of applications, including navigation applications. While a device may be capable of performing functions beyond those of a navigation application, it may be undesirable to introduce distractions to a user who is using the navigation application while driving. Providing additional information beyond the navigation function may distract a driver, despite the potential benefit of additional information to a passenger in the vehicle.

SUMMARY

In general, an example embodiment of the present invention provides a method, apparatus, and computer program product for the collaborative presentation of information relating to a travel route. In particular, the method of example embodiments may include providing for display of primary information on a display of a first device, providing for display of ancillary information on a display of a second device, receiving location information at the first device, and updating the ancillary information provided for display on the display of the second device in response to receiving the location information at the first device. The primary information may include route-guidance information for a route. The ancillary information may include information associated with the route. The ancillary information may include additional information relative to the primary information. The ancillary information may include point-of-interest information along the route. Example methods may optionally include receiving a waypoint request at the first device from the second device, and revising the route to include the waypoint in response to approving the waypoint request from the second device. Methods may optionally include receiving, at the first device, a revised route from the second device, and providing for route-guidance for the revised route on the display of the first device. Methods may also optionally include generating a revised route at the first device and causing the revised route to be transmitted to the second device, where the revised route is generated in response to location information received at the first device not corresponding to the original route.

Example embodiments of the invention may provide a first apparatus including at least one processor and at least one memory including computer program code. The at least one memory and the computer program code configured to, with the at least one processor, cause the first apparatus to provide primary information comprising route-guidance information for a route, receive location information, update the primary information in response to the location information, and provide for updated primary information to be transmitted to a second apparatus located remotely relative to the first apparatus. The first apparatus may also be caused to receive a waypoint request from the second apparatus and revise the route to include the waypoint in response to the waypoint request from the second apparatus being approved. The apparatus may optionally be caused to receive a revised navigation route from a second apparatus and provide for route-guidance for the revised route. The apparatus may optionally be caused to generate a revised route and provide for transmission of the revised route to the second apparatus, where the revised route is generated in response to location information received not corresponding to the original route.

Example embodiments of the invention may provide a second apparatus including at least one processor and at least one memory including computer program code. The at least one memory and the computer program code configured to, with the at least one processor, cause the second apparatus to provide for display of ancillary information related to route-guidance information generated on a first apparatus, receive location information from the first apparatus, update the ancillary information in response to receiving the location information from the first apparatus, and provide for display of the updated ancillary information. The second apparatus may optionally be caused to provide for sending a waypoint request to the first apparatus, and provide for display of detailed ancillary information related to a revised route generated on the first apparatus, where the revised route is generated in response to receiving the waypoint request. The second apparatus may optionally be caused to generate a revised route in response to receiving a waypoint request, and provide for transmitting the revised route to the first apparatus. The apparatus may optionally be caused to provide for display of revised ancillary information related to a revised route in response to receiving a revised route from the first apparatus, where the revised route is received in response to receiving location information not corresponding to the original route.

Embodiments of the present invention may provide a computer program product including at least one non-transitory, computer-readable storage medium having computer executable program code instructions stored therein. The computer executable program code instructions may include program code instructions to provide for display of primary information on a display of a first device, program code instructions to provide for display of ancillary information on a display of a second device, program code instructions to receive location information at the first device, and program code instructions to update the ancillary information provided for display on the display of the second device in response to receiving the location information at the first device. The primary information may include route-guidance information for a route and the ancillary information may include information associated to said route. The ancillary information may include additional information related to the primary information. The ancillary information may include point-of-interest information along the route. The computer program product of some example embodiments may include program code instructions to receive a waypoint request at the first device from the second device, and program code instructions to revise the route to include the waypoint in response to approving the waypoint request from the second device. Computer program products of some example embodiments may include program code instructions to receive, at the first device, a revised route from the second device, and program code instructions to provide for route-guidance for the revised route on the display of the first device. A computer program product according to some example embodiments may include program code instructions to generate a revised route at the first device and program code instructions to cause the revised route to be transmitted to the second device, where the revised route may be generated in response to location information received at the first device not corresponding to the original route.

DRAWINGS

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Devices that may benefit from example embodiments of the present invention may include portable devices, such as tablet computers, cellular telephones, portable media devices, in-vehicle navigation and/or media systems, or the like, which are enhanced by a graphical user interface presented on a display, such as a touch screen. These devices may be used for navigation, such as establishing and guiding a user along a route as they drive. As such devices may be capable of functions far exceeding navigation, devices of example embodiments of the invention may be configured to collaboratively present a primary information including route guidance using a navigation application on one device while simultaneously collaborating with a second device to provide ancillary information, such as a greater level of detail with regard to the route, for example, detailed point-of-interest information, hotel availability, restaurant reviews, historical information, etc.

Some embodiments of the present invention may relate to a provision of a mechanism by which two or more devices operate collaboratively to present primary information including route-guidance navigation information on a first device and ancillary information including detailed information regarding the navigation route and point-of-interest information on a second device. The ancillary information provided for display on a second device may be considered ancillary information relative to the primary route-guidance information of the first device since the ancillary information may not be necessary for route-guidance, but may provide useful information beyond that available during route-guidance. A person driving a vehicle may require route-guidance from a navigation application of a device and may be distracted by superfluous information that isn't related to route-guidance. Route-guidance may include images (e.g., a map or satellite image) with a calculated route shown thereon to provide a visual indication to a user of a calculated route. Visual indications may also include graphics and/or text which may provide a user with information regarding a calculated route. Route-guidance may also include audible instructions provided to a user of approaching turns, street names, or other instructions which may assist a user in continuing on an established route.

Ancillary information, such as information beyond route-guidance may not be needed and may be distracting to a user driving a vehicle. However, a passenger in the vehicle may find additional information about the route, points-of-interest along the route, or other ancillary information helpful. As such, it may be desirable for a first device to provide primary information including route-guidance information through a navigation application to a user while a second device, operating collaboratively, provides ancillary information including information about the route or points-of-interest along the route to another user.

Figure 1:
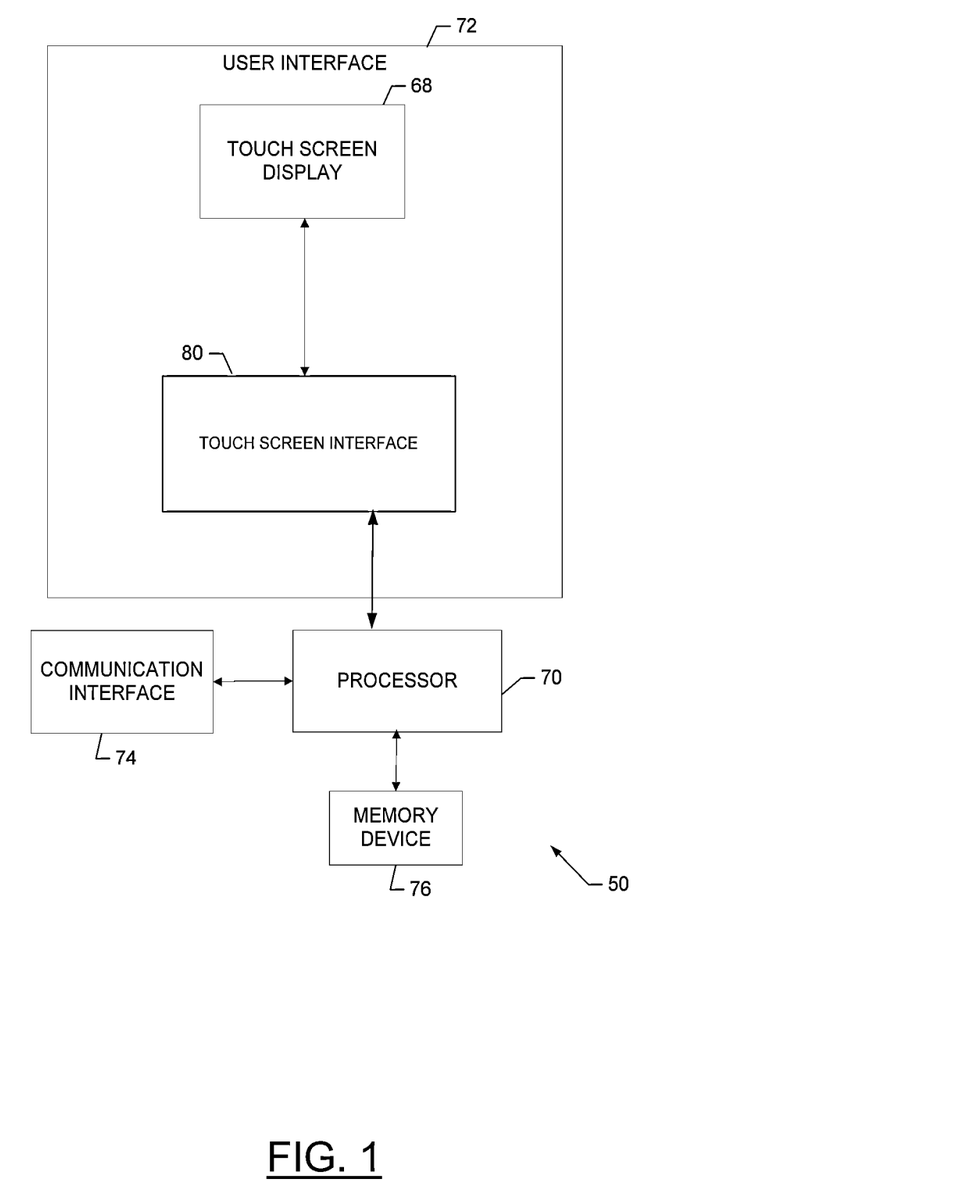
FIG. 1 is a schematic block diagram of an apparatus which may operate together with one or more other apparatuses in a collaborative manner to provide information to one or more users according to an example embodiment of the present invention.

One example embodiment of the invention is depicted in FIG. 1 which illustrates a block diagram of an apparatus 50 that would benefit from embodiments of the present invention. It should be understood, however, that the mobile apparatus 50 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices, such as an in-dash vehicle navigation system or in-vehicle media system may also employ some example embodiments.

An example embodiment of the present invention will now be described with reference to FIG. 1, in which certain elements of an apparatus 50 for providing a mechanism by which relevant content may be determined and/or presented are illustrated. The apparatus 50 may, in some embodiments, be a mobile terminal or a computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, device surfaces and/or sensors capable of detecting objects hovering over the surface, soft keys, a microphone, a speaker, motion sensor, temperature sensor, accelerometer, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a display, such as the illustrated touch screen display 68. In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, etc. techniques. The user interface 72 may be in communication with the touch screen display 68 to receive indications of user inputs at the touch screen display 68 and to modify a response to such indications based on corresponding user actions that may be inferred or otherwise determined responsive to the indications. In one alternative, a touch input may be provided other than by direct interaction with a display (e.g., in cases where the user interface is projected onto a wall with a projector, or where a cursor is used to direct input on the display).

In an example embodiment, the apparatus 50 may include a touch screen interface 80. The touch screen interface 80 may, in some instances, be a portion of the user interface 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an indication of an input in the form of a touch event at the touch screen display 68. As such, the touch screen interface 80 may be in communication with the touch screen display 68 to receive indications of user inputs at the touch screen display 68 and to modify a response to such indications based on corresponding user actions that may be inferred or otherwise determined responsive to the indications. Following recognition of a touch event, the touch screen interface 80 may be configured to determine a classification of the touch event and provide a corresponding function based on the touch event in some situations. Optionally, a device may be configured to recognize a hovering input where a user may use a stylus or finger to hover over a tile or interactive element and the device may be configured to recognize the hovering as an input, for example, by using user interface 72.

Figure 2:
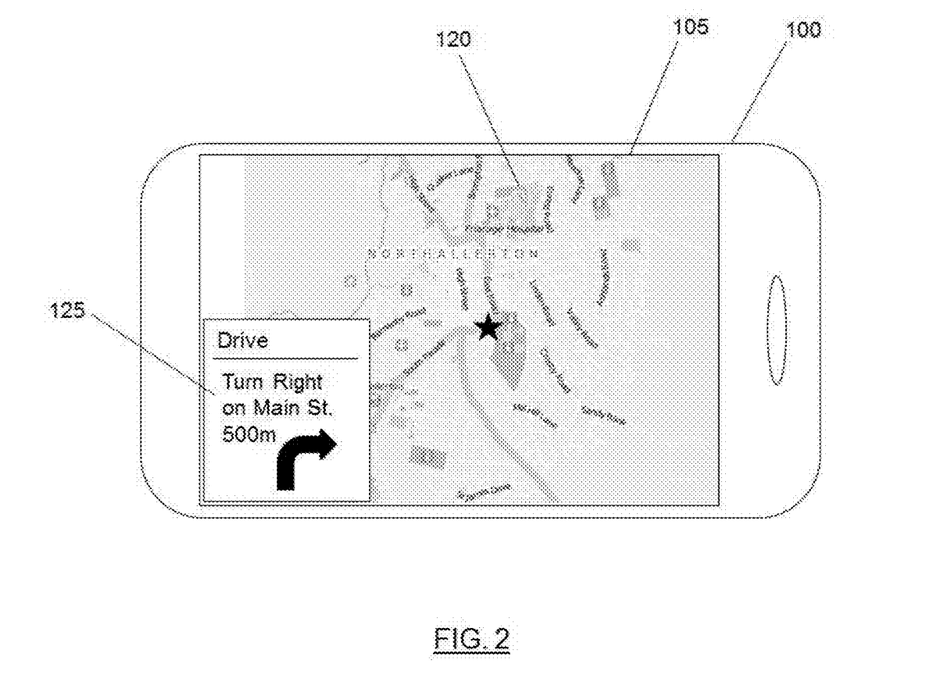
FIG. 2 is an illustration of a device providing for display of route-guidance in a navigation application.

As outlined herein, example embodiments of the system may include more than one apparatus operating in collaboration with each other to provide an enhanced user experience for one or more users. FIG. 2 illustrates a device 100 for providing a mechanism by which information may be presented to a user while collaboratively operating with one or more other devices. The illustrated device 100 of FIG. 2 includes a display 105 which is depicted presenting a navigation application interface 120. The display 105 may be a touch screen display such as touch screen 68 of user interface 72 of FIG. 1. The navigation application 120 may be provided for display by a processor (e.g., processor 70). In some example embodiments, the device 100 may be a thin device or function as merely a display apparatus for displaying images provided by a remote processing unit and/or receiving input from a user for sending to the remote processing unit where the navigation application is operating. For example, the apparatus 100 may be an in-dash unit of a vehicle where the display 105 is operatively connected via wired or wireless connection to a processing unit within the vehicle.

As shown, the display 105 may provide for presentation of a navigation application 120 which may include a map (as shown), satellite image, street-view image, or the like. The navigation application may provide for display of a route from a first location to a destination. Turn-by-turn directions may be provided, such as direction 125 instead of or in addition to a route illustrated on the displayed map 120. Such information will be referred to herein collectively as "route-guidance" which includes any information that may be provided to a user to aid the user in following a route to a destination. The route-guidance may also include audible instructions alerting a driver to upcoming turns, distances, traffic, etc.

The information presented for display on the example embodiment of FIG. 2 may be useful for a driver in order to navigate along a route; however, this information may be relatively limited. As the primary focus of a user driving a vehicle may be to concentrate on operating the vehicle and observing conditions around the vehicle, it may be desirable that the route-guidance of the navigation application may provide only information which may aid the driver in safely navigating the planned route. While some ancillary information may be presented on the display 105, such information may generally be unobtrusive in order to avoid driver distraction.

Figure 3:
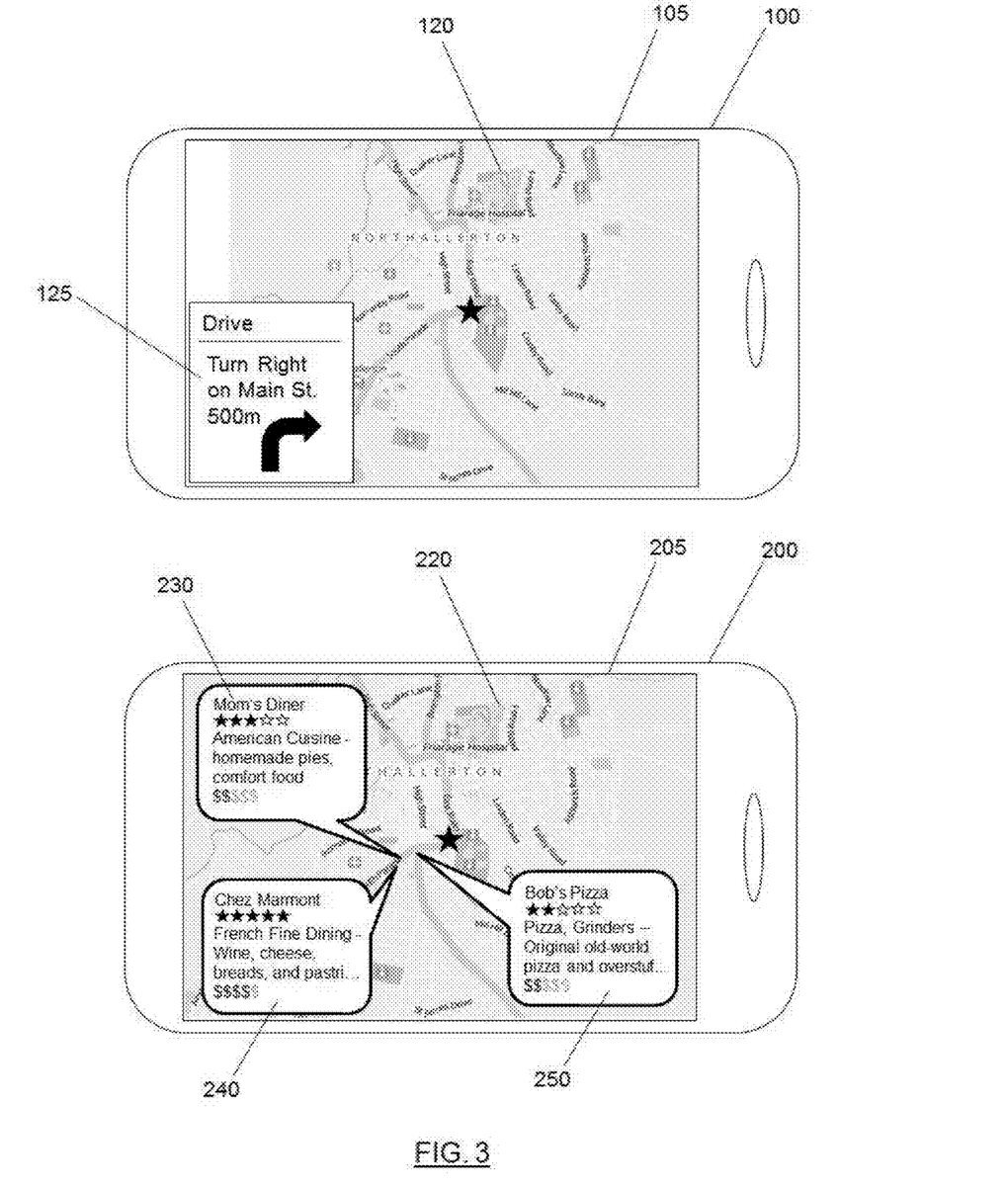
FIG. 3 is an illustration of a first device and a second device which may operate collaboratively according to an example embodiment of the present invention.

FIG. 3 illustrates the first device 100 and a second device 200 including display 205 which may operate in collaboration with the first device 100. The second device 200 may be an apparatus 50 as illustrated in FIG. 1 with display 205 corresponding to display 68 of the apparatus. While the first device 100 may present route-guidance information to a first user, the second device 200 may provide detailed information relating to the route provided by the navigation application 120 of FIG. 2.

The first device 100 and the second device 200 may operate in collaboration in a variety of manners. For example, the first device 100 may be a primary device configured to control the information provided for display of the first device and the second device. In this manner, the first device may dictate what is to be displayed on the first display 105 and the second display 205. The first device 100 may be in communication with the second device (e.g., via communication interface 74 of the apparatus 50 of FIG. 1) using a wired or wireless connection. A wireless connection may be via near-field communication protocols such as Bluetooth®, WLAN (e.g., Wi-Fi using 802.11 standards), ZigBee™, infrared communication, etc. In some example embodiments, the first device 100 and second device 200 may operate with some level of independence and share information between them related to the route, location, waypoints, etc. Information shared between the first device 100 and the second device 200 may range from minimal data exchange where location or point-of-interest information is exchanged, or the information shared between the first device 100 and the second device 200 may be extensive, such as where the first device 100 provides the information for display on the second device 200 where the second device 200 functions merely as a second display of the first device, with the first device providing the majority of the processing functionality. The collaboration may be at either of these extremes, or any level therebetween where information is shared between the devices.

Collaboration between the first device 100 and the second device 200 may enable the second device 200 to provide for display of information beyond the route-guidance information provided on the display 105 of the first device 100. As shown in FIG. 3, the first device 100 may be configured to provide for display of primary information including the navigation application 220 displaying a map of the route 120, and the second device 200 may be configured to provide for display of ancillary information relating to points-of-interest along the route or proximate the route. In the illustrated embodiment of FIG. 3, three points-of-interest 230, 240, 250 are shown on the display 205 of the second device 200 with information relating to each. The three points-of-interest 230, 240, 250 include restaurants and the information presented includes restaurant names, subjective ratings of the restaurants, general information, and relative price. This ancillary information, unrelated to route-guidance, may be distracting to a user operating a vehicle; however, this ancillary information may be useful to a passenger who is looking for restaurants along the route. The user of the second device 200 may be able to gather additional information about the restaurants by selecting any one of the points-of-interest 230, 240, 250 where detailed information may be provided on the display 205.

The collaboration between the first device 100 and the second device 200 may include providing location information from the first device to the second device (or vice-versa). The location information may be received through a global positioning service (GPS) receiver within one of the devices, such as through communications interface 74 of apparatus 50 of FIG. 1. The location information may be used by the first device to determine the position of the first device 100 along the route and to provide accurate route-guidance, such as turn-by-turn directions to a user of the first device 100. Location information may be received separately on the second device 200 by a GPS receiver (e.g., via communication interface 74) or may be sent from the first device 100 to the second device 200. The second device 200 may use the location information to determine points-of-interest that are proximate the current location of the devices.

Figure 4:
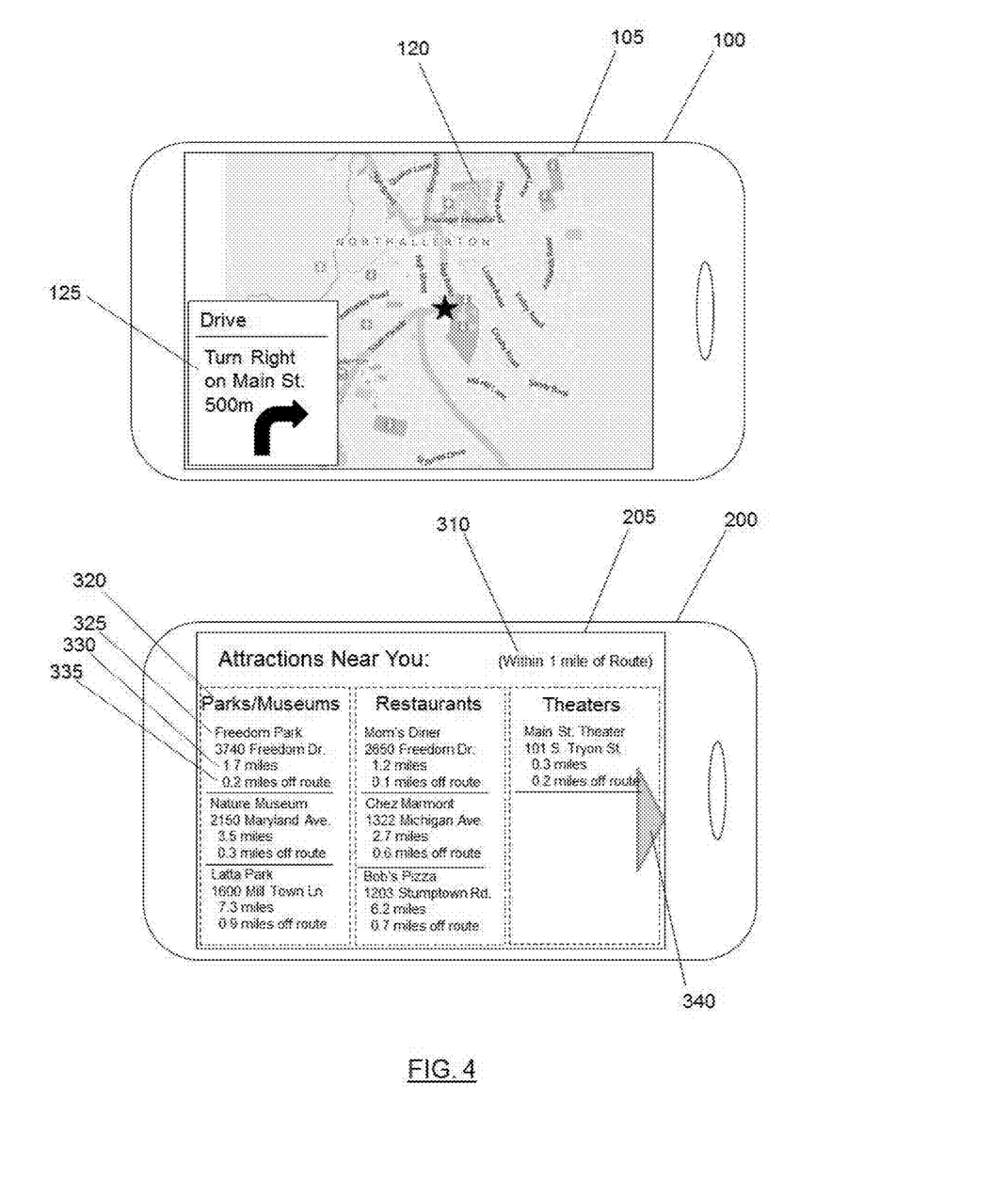
FIG. 4 is another illustration of a first device and a second device which may operate collaboratively according to an example embodiment of the present invention.

FIG. 4 illustrates another example embodiment of a device which may operate collaboratively with a first device 100. Illustrated on the display 205 of the device 200 of FIG. 4 is ancillary information including a listing of attractions. The listing of attractions may be obtained through a network connection, such as a wireless connection to the Internet via communication interface 74 of the apparatus 50 of FIG. 1. In the illustrated embodiment, the listing of attractions is filtered, for example by processor 70, to be within one mile of the planned route as shown at 310. The first device 100 may collaborate with the second device 200 to provide route information such that the attractions list can be generated based upon a distance of the attractions from the planned route. In the illustrated embodiment, Parks/Museums 320 are shown as well as Restaurants and Theaters. Additional categories may be available off of the display 205 accessible, for example, via arrow 340. The distance from the route option 310 may be user adjustable in order to find additional attractions further or close to the planned route. While the device of FIG. 4 is described with respect to collaboration with a first device 100, embodiments of the devices provided herein may operate collaboratively with multiple devices, such as when several people in a vehicle are interested in reviewing information about a route separately on different devices.

In the illustrated embodiment of FIG. 4, attractions listed may include an attraction name (e.g., "Freedom Park" 320), an address 325, a distance from the current location 330, and a distance off of the planned route 335. In this manner, a user is able to determine the attractions along the route, their distance away from the current location, and how far off of their planned route they must travel to reach the attraction or point-of-interest. A user of the device 200 of FIG. 4 may select a point-of-interest to receive more information regarding the point-of-interest.

Figure 5:
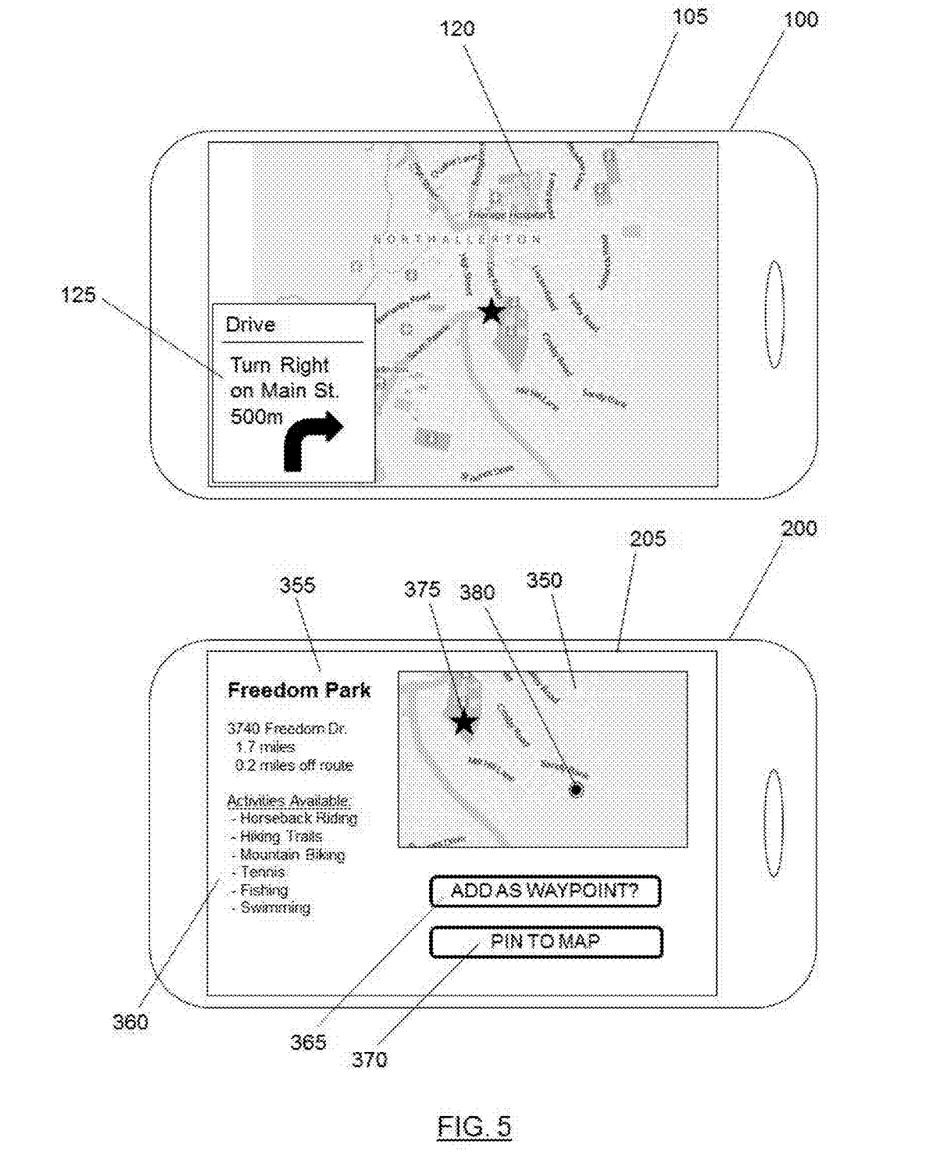
FIG. 5 is another illustration of a first device and a second device which may operate collaboratively according to an example embodiment of the present invention.

FIG. 5 illustrates second device 200 providing for display of a selected point-of-interest including "Freedom Park." The second device 200 may display additional details about the selected point-of-interest including the name 355, address, distance, distance from route, and additional details 360. This information may be obtained via the communications interface 74 of apparatus 50 communicating with a network such as the Internet. Optionally, a database of points-of-interest may be stored locally, such as in memory device 76 of apparatus 50, one or more of the devices collaborating. The detailed information regarding the point-of-interest shown on display 205 in FIG. 5 may also include a map 350 showing the physical location of the point-of-interest 375. The map 350 may also include a representation of the current location of the device 380. The location of the device 380 may be obtained through a location application, such as GPS, in one or more of the collaborating devices. The detailed ancillary information may also include a proposed route to the point-of-interest, an estimated time-of-arrival, etc.

The detailed information presented on the display 205 of the second device 200 may optionally include user input functions to add the point-of-interest as a waypoint 365 and/or to pin the point-of-interest to the map (e.g., to place a marker in the map of the navigation application without calculating a route). A selection of the "add as waypoint" user input function on the second device 200 collaborating with a first device 100 may send the waypoint to the first device to be included in the route. Optionally, a revised route may be calculated on the device 200 and the updated route may be sent to the first device 100 for revised route-guidance.

Figure 6:
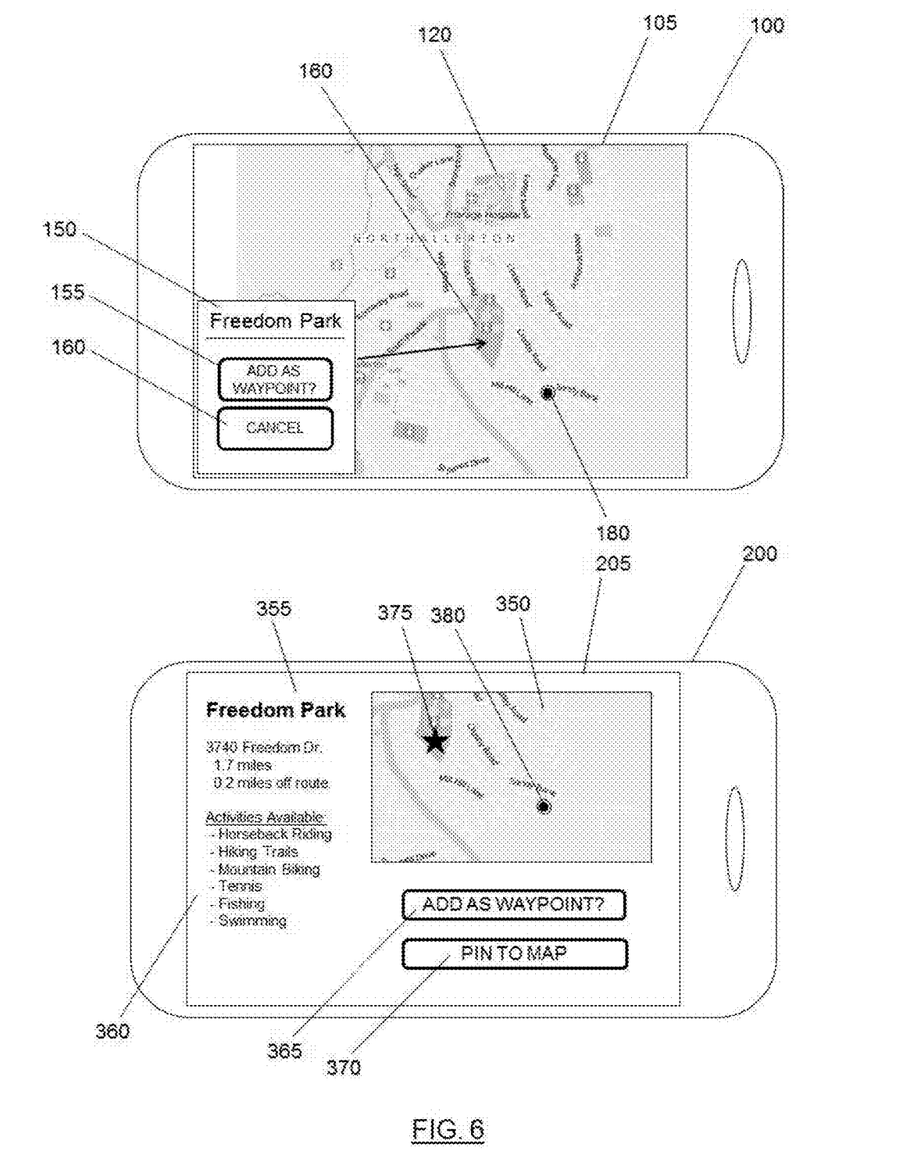
FIG. 6 is an illustration of a notification of a waypoint request presented on the display of a first device providing route-guidance to a user with a navigation application as received from a second device according to an example embodiment of the present invention.

FIG. 6 illustrates an example embodiment of the first user device 100 operating a navigation application for providing for display of primary information including route-guidance for a user operating a vehicle as described above. The first device 100, while operating in collaboration with the device 200, may receive a request 150 for the addition of a waypoint to the route. The request 150 may be presented to a user as a notification which may include an option for adding the point-of-interest as a waypoint 155. Optionally, the notification 150 may also include a user input function for canceling the waypoint request 160, resulting in no change to the route. As illustrated, the location of the suggested waypoint of "Freedom Park" may be shown on the display 105 at 160 illustrated relative to the current position of the device at 180.

Figure 7:
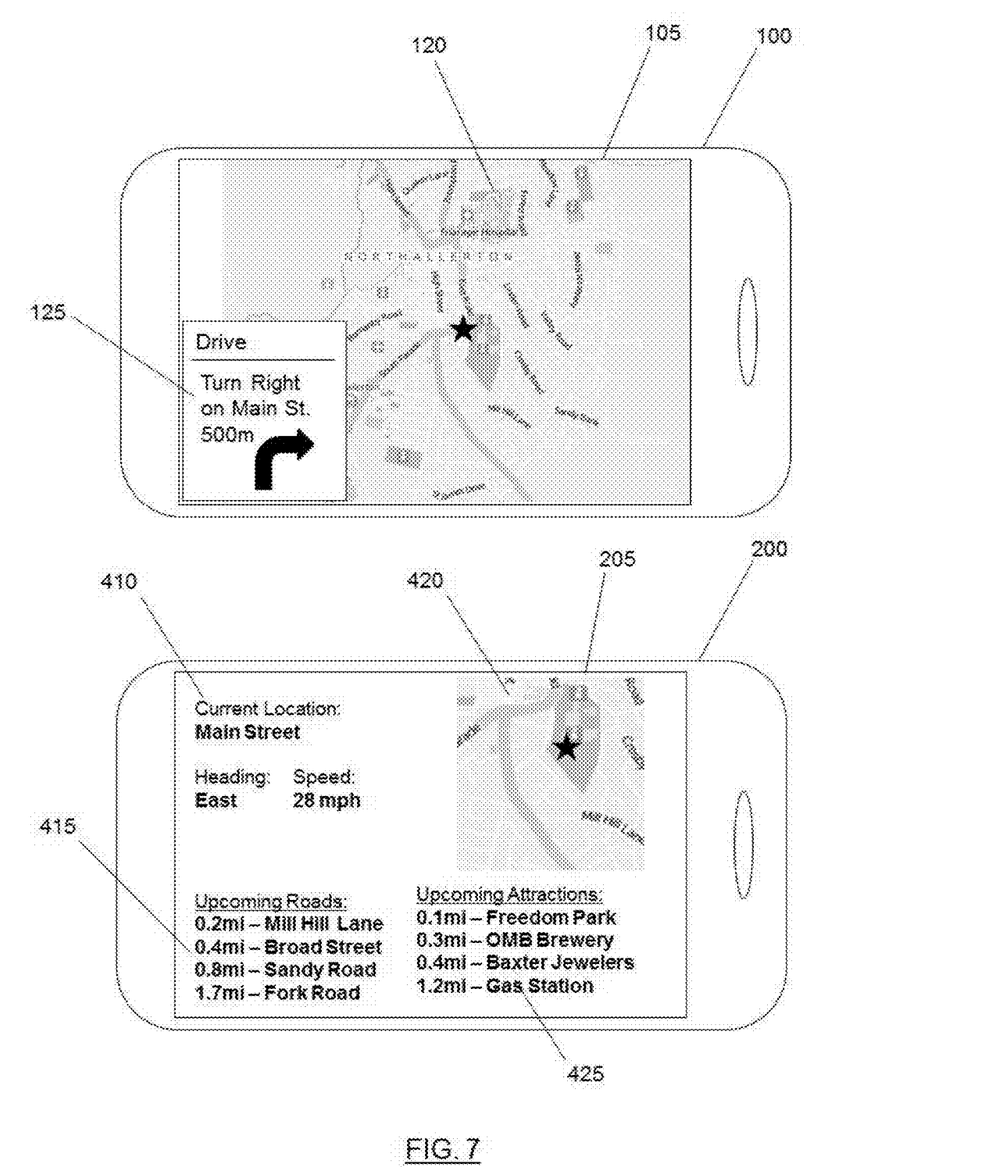
FIG. 7 is another illustration of a first device and a second device which may operate collaboratively.

Another example embodiment of a second device 200 operating collaboratively with a first device 100 providing route-guidance to a user is shown in FIG. 7 which depicts a second device 200 with display 205 configured to present ancillary information related to the route being driven. In the illustrated embodiment, the display 205 may be configured to present real-time information relating to the route along which the first device 100 and the collaborating device 200 are traveling. The real-time information may be obtained from the first device 100 operating as a primary device providing information to the second device 200 via communication interface 74, or the device 200 may receive information from a location service and information obtained from a network connection such that a processor (e.g., processor 70 of FIG. 1) may provide for display of the information on the display 205. In some example embodiments, the second device 200 may be configured to receive some information from the first device 100 while receiving other information from a network and/or location service, e.g., through communication interface 74 of apparatus 50. The information provided for display may include some or all of a current location 410, heading (e.g., direction of travel), speed of travel, etc. The information may also include a map 420 showing a location of the device 200 on the map 420. The display 205 may further be provided (e.g., via processor 70) with information regarding upcoming roads and intersections 415 and upcoming attractions. The upcoming roads and attractions may be determined based upon location information received via a location service or the first device operating in collaboration with a network (e.g., the Internet) or a locally stored database (e.g., in memory device 72) of roads, intersections, and points-of-interest. The location information along with the heading may be correlated to a map or database of points-of-interest to ascertain which roads or points-of-interest are ahead. After a location of the device, as established by a location system such as GPS (received through communication interface 74) is determined to be past one of the roads or points-of-interest, that road or point-of-interest may be removed from the list of upcoming roads 415 or points-of-interest 425.

As outlined above, embodiments of the present invention may provide for collaboration between two or more devices, which may each be embodied as an apparatus 50 as shown in FIG. 1, to effectively provide primary information to a user while providing ancillary information to another user. The primary information may include route-guidance information presented to a driver of a vehicle while the ancillary information may be detailed information regarding the route or points-of-interest along the route.

Figure 8:
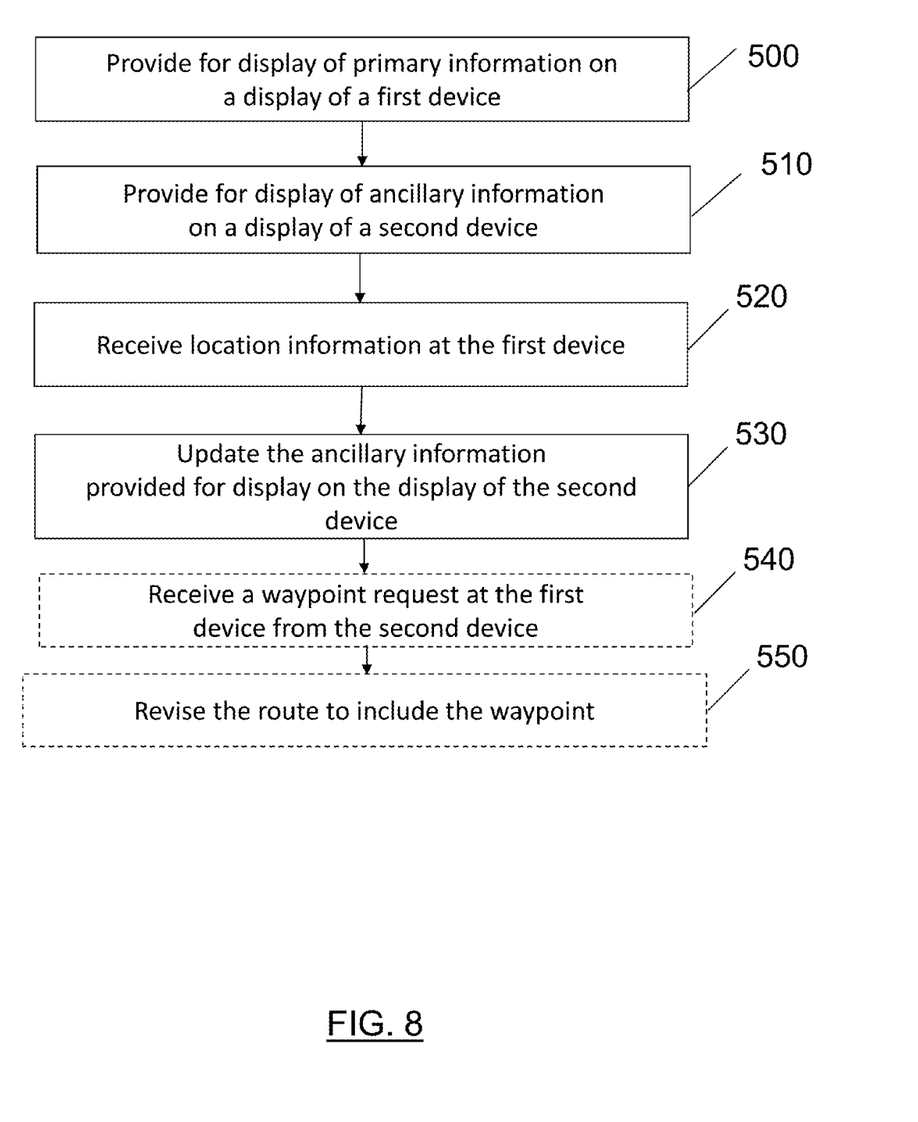
FIG. 8 is a flowchart of a method for two or more devices to operate in a collaborative manner to provide primary information on a first device and ancillary information on a second device according to an example embodiment of the present invention.

FIG. 8 is a flowchart of a method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user device and executed by a processor in the user device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 8, may include providing for display of primary information on a display of a first device as shown at 500, where the primary information includes route-guidance information for a route. The method may also include providing for display of ancillary information on a display of a second device, as shown at 510, where the ancillary information includes point-of-interest information along the route, and where the point-of-interest information provided for display on the display of the second device is greater than point-of-interest information available on the display of the first device. The method may further include receiving location information at the first device at 520, and updating the detailed point-of-interest information provided for display on the display of the second device in response to receiving the location information at the first device at 530.

In some embodiments, certain ones of the operations above may be modified or further amplified as described below. Moreover, in some embodiments additional optional operations may also be included, as indicated by the dashed lines in FIG. 8. It should be appreciated that each of the modifications, optional additions or amplifications below may be included with the operations above either alone or in combination with any others among the features described herein. With reference to the method of FIG. 8, some example embodiments may include receiving a waypoint request at the first device from the second device at 540 and revising the route to include the waypoint at 550.

In an example embodiment, an apparatus for performing the method of FIG. 8 above may comprise a processor (e.g., the processor 70) configured to perform some or each of the operations (500-550) described above. The processor 70 may, for example, be configured to perform the operations (500-550) by performing hardware implemented logical functions, executing stored instructions, or executing algorithms for performing each of the operations. Alternatively, the apparatus may comprise means, such as the processor, at least one processor and at least one memory including a computer program code, a computer program product, or the like for performing each of the operations described above.

An example of an apparatus according to an example embodiment may include at least one processor and at least one memory including computer program code. The at least one memory and the computer program code may be configured to, with the at least one processor, cause the apparatus to perform the operations 500-550 (with or without the modifications and amplifications described above in any combination).

An example of a computer program product according to an example embodiment may include at least one computer-readable storage medium having computer-executable program code portions stored therein. The computer-executable program code portions may include program code instructions for performing operations 500-550 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
providing for display of primary information on a display of a first device, wherein the primary information comprises route-guidance information for a route;
providing for display of ancillary information on a display of a second device, wherein the ancillary information is associated to said route-guidance information,
receiving location information at the first device;
updating, by a processor, the ancillary information provided for display on the display of the second device in response to receiving the location information at the first device;
receiving a waypoint request at the first device from the second device; and
revising the route to include a waypoint in response to approving the waypoint request from the second device.

2. The method of claim 1, wherein the ancillary information comprises additional information relative to the primary information.

3. The method of claim 2, wherein the ancillary information includes point-of-interest information along the route.

4. The method of claim 1, wherein the route is an original route, the method further comprising:
generating a revised route at the first device; and
causing the revised route to be transmitted to the second device.

5. The method of claim 4, wherein the revised route is generated in response to location information received at the first device not corresponding to the original route.

6. A first apparatus comprising at least one processor and at least one memory including computer program code, the at least one memory and the computer program code configured to, with the at least one processor, cause the apparatus to:
provide primary information comprising route-guidance information for a route;
receive location information;
update the primary information in response to the location information;
provide for updated primary information to be transmitted to a second apparatus, located remotely relative to the first apparatus; and
receive a waypoint request from the second apparatus; and revise the route to include the waypoint in response to a waypoint request from the second apparatus being approved.

7. The first apparatus of claim 6, wherein the first apparatus is further caused to receive a revised navigation route from the second apparatus; and provide for route-guidance for the revised route.

8. The first apparatus of claim 6, wherein the route is an original route, and wherein the apparatus is further caused to generate a revised route, and provide for transmission of the revised route to the second apparatus.

9. The first apparatus of claim 8, wherein the revised route is generated in response to location information received not corresponding to the original route.

10. A second apparatus comprising at least one processor and at least one memory including computer program code, the at least one memory and the computer program code configured to, with the at least one processor, cause the apparatus to:
provide for display of ancillary information related to route-guidance information generated on a first apparatus;
receive location information from the first apparatus;
update the ancillary information in response to receiving the location information from the first apparatus;
provide for display of the updated ancillary information;
provide for sending a waypoint request to the first apparatus; and
provide for display of ancillary information related to a revised route generated on a first apparatus, wherein the revised route is generated in response to receiving the waypoint request.

11. The second apparatus of claim 10, wherein the second apparatus is further caused to generate a revised route in response to receiving a waypoint request; and provide for transmitting the revised route to the first apparatus.

12. The second apparatus of claim 10, wherein the route is an original route, and wherein the second apparatus is further caused to provide for display of revised ancillary information related to a revised route in response to receiving a revised route from the first apparatus.

13. A computer program product comprising at least one non-transitory computer-readable storage medium having computer executable program code instructions stored therein, the computer executable program code instructions comprising:
program code instructions to provide for display of primary information on a display of a first device, wherein the primary information comprises route-guidance information for a route;
program code instructions to provide for display of ancillary information on a display of a second device, wherein the ancillary information is associated to said route-guidance information;
program code instructions to receive location information at the first device;
program code instructions to update the ancillary information provided for display on the display of the second device in response to receiving the location information at the first device;
program code instructions to receive a waypoint request at the first device from the second device; and
program code instructions to revise the route to include a waypoint in response to approving the waypoint request from the second device.

14. The computer program product of claim 13, wherein the ancillary information comprises additional information related to the primary information.

15. The computer program product of claim 14, wherein the ancillary information includes point-of-interest information along the route.

16. The computer program product of claim 13, further comprising:

program code instructions to receive, at the first device, a revised route from the second device; and program code instructions to provide for route-guidance for the revised route on the display of the first device.

* * * * *